(12) United States Patent
Takahashi et al.

(10) Patent No.: US 12,554,076 B2
(45) Date of Patent: Feb. 17, 2026

(54) MULTI-CORE OPTICAL FIBER CONNECTOR

(71) Applicant: KDDI CORPORATION, Tokyo (JP)

(72) Inventors: Hidenori Takahashi, Fujimino (JP); Daiki Soma, Fujimino (JP); Noboru Yoshikane, Fujimino (JP); Takehiro Tsuritani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 306 days.

(21) Appl. No.: 18/115,245

(22) Filed: Feb. 28, 2023

(65) Prior Publication Data

US 2023/0204871 A1 Jun. 29, 2023

Related U.S. Application Data

(63) Continuation of application No. PCT/JP2021/018914, filed on May 19, 2021.

(30) Foreign Application Priority Data

Sep. 29, 2020 (JP) .................................. 2020-163234

(51) Int. Cl.
 *G02B 6/38* (2006.01)
(52) U.S. Cl.
 CPC ......... *G02B 6/3885* (2013.01); *G02B 6/3825* (2013.01); *G02B 6/3869* (2013.01)
(58) Field of Classification Search
 CPC .................................................. G02B 6/3825
 USPC ........................................................ 385/59
 See application file for complete search history.

(56) References Cited

U.S. PATENT DOCUMENTS

| | | | | |
|---|---|---|---|---|
| 4,726,647 A * | 2/1988 | Kakii | ..................... | G02B 6/389 385/60 |
| 5,317,663 A | 5/1994 | Beard et al. | | |
| 6,318,903 B1 * | 11/2001 | Andrews | .............. | G02B 6/3869 385/77 |
| 9,612,407 B2 * | 4/2017 | Kobayashi | ........... | G02B 6/3869 |
| 10,146,015 B2 * | 12/2018 | Zimmel | ............... | G02B 6/3871 |
| 10,545,295 B1 * | 1/2020 | Sato | .................... | G02B 6/3825 |

(Continued)

FOREIGN PATENT DOCUMENTS

| | | |
|---|---|---|
| EP | 1 445 633 B1 | 8/2004 |
| JP | S63-060421 A | 3/1988 |

(Continued)

OTHER PUBLICATIONS

European search report for EP Appl. Ser. No. EP 21874808 dated Feb. 12, 2024 (9 pages).

*Primary Examiner* — Kaveh C Kianni
(74) *Attorney, Agent, or Firm* — Foley & Lardner LLP

(57) ABSTRACT

A connector that connects a first multi-core optical fiber to which a first plug is provided and a second multi-core optical fiber to which a second plug is provided to one another, includes: a first jack for inserting the first plug; and a second jack for inserting the second plug, wherein the first jack is configured so that the first plug in a first state and the first plug in a second state can at least be inserted thereinto, and the first plug in the second state is obtained by rotating the first plug in the first state by 180 degrees about an insertion direction as the axis of rotation, the insertion direction being the direction in which the first plug is inserted into the first jack.

13 Claims, 9 Drawing Sheets

(56) References Cited

U.S. PATENT DOCUMENTS

| | | | | |
|---|---|---|---|---|
| 2003/0031422 A1* | 2/2003 | Inagaki | ............... | G02B 6/3825 |
| | | | | 385/60 |
| 2003/0215190 A1* | 11/2003 | Lampert | ............... | G02B 6/3812 |
| | | | | 385/76 |
| 2004/0072454 A1* | 4/2004 | Nakajima | ............ | G02B 6/3807 |
| | | | | 439/79 |
| 2005/0013549 A1* | 1/2005 | Terakura | ............ | G02B 6/3843 |
| | | | | 385/78 |
| 2011/0085764 A1* | 4/2011 | Greub | ................. | G02B 6/3879 |
| | | | | 385/60 |
| 2014/0029897 A1* | 1/2014 | Shimazu | ............. | G02B 6/3807 |
| | | | | 385/76 |
| 2015/0177467 A1* | 6/2015 | Gniadek | ............. | H01R 13/625 |
| | | | | 439/365 |
| 2015/0293310 A1* | 10/2015 | Kanno | ................ | G02B 6/3891 |
| | | | | 385/78 |
| 2016/0004016 A1* | 1/2016 | Zimmel | .............. | G02B 6/3825 |
| | | | | 385/59 |
| 2017/0209344 A1* | 7/2017 | Babbs | ................. | A61J 15/0053 |
| 2017/0343741 A1* | 11/2017 | Coenegracht | ........ | G02B 6/3871 |
| 2018/0031773 A1* | 2/2018 | Ohtsuka | ............. | G02B 6/2552 |
| 2018/0332723 A1* | 11/2018 | Coffey | .................. | H01R 12/70 |
| 2020/0166715 A1* | 5/2020 | Shimakawa | ......... | G02B 6/3821 |
| 2020/0271867 A1* | 8/2020 | Ishikawa | .............. | G02B 6/3889 |
| 2020/0310050 A1* | 10/2020 | Herrick | ............... | G02B 6/3894 |
| 2024/0027694 A1* | 1/2024 | Lu | ........................ | G02B 6/3879 |

FOREIGN PATENT DOCUMENTS

| | | |
|---|---|---|
| JP | H11-072654 A | 3/1999 |
| JP | 2013-195561 A | 9/2013 |
| JP | 2014-182229 A | 9/2014 |
| JP | 2015-172639 A | 10/2015 |
| KR | 20100050179 A | 5/2010 |
| WO | WO-2018/180898 A1 | 10/2018 |

\* cited by examiner

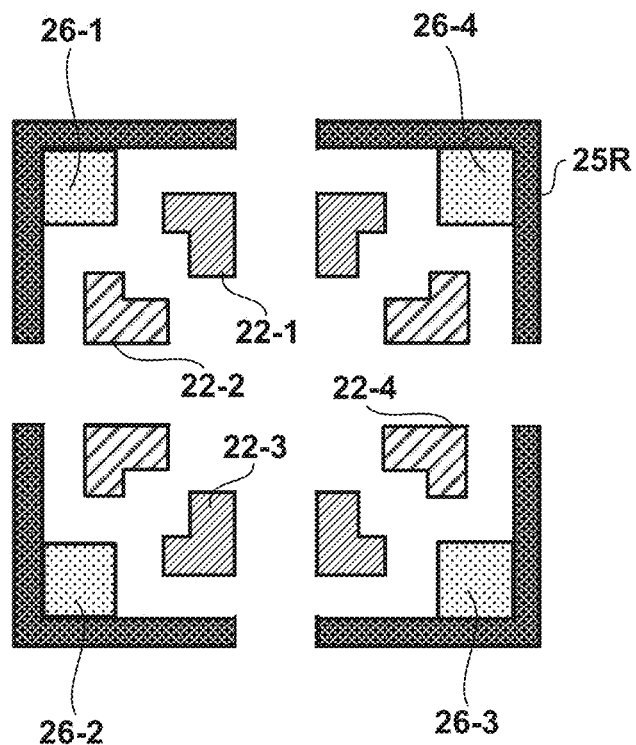
F I G. 10C
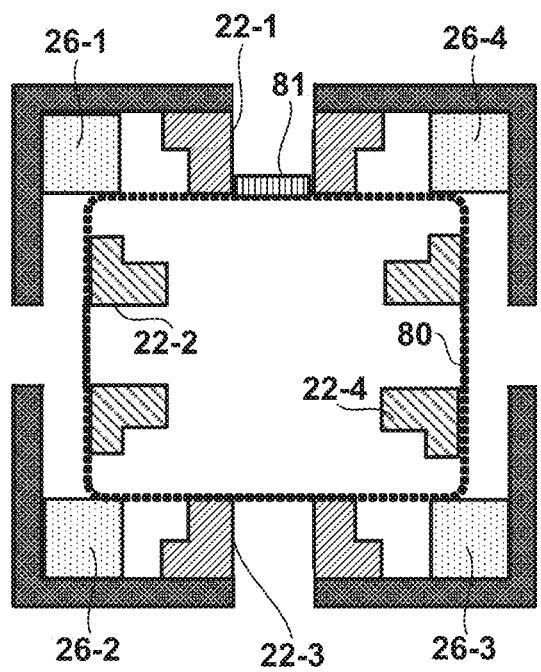
F I G. 11

MULTI-CORE OPTICAL FIBER CONNECTOR

CROSS-REFERENCE TO RELATED APPLICATIONS

This application is a Continuation of International Patent Application No. PCT/JP2021/018914, filed May 19, 2021, which claims the benefit of Japanese Patent Application No. 2020-163234, filed Sep. 29, 2020, both of which are hereby incorporated by reference herein in their entirety.

BACKGROUND OF THE INVENTION

Field of the Invention

The present invention relates to a connector for connecting multi-core optical fibers (MCFs) to one another.

Background Art

Connectors are used to connect optical fibers to optical communication devices and the like. Note that, in the present specification, the term "connector" collectively refers to the terms "plug" and "jack". Furthermore, in the present specification, the term "plug" refers to an optical member that is usually provided at an end portion of an optical fiber. In addition, in the present specification, the term "jack" refers to an optical member that is configured so that a plug can be inserted thereinto. For example, a jack is provided in an optical communication device. By inserting a plug provided at an end portion of an optical fiber into a jack provided in an optical communication device, the optical fiber can be connected to the optical communication device.

In the following description, the direction in which a plug is inserted into a jack is referred to as an "insertion direction". Furthermore, in the following description, the terms "front side" and "rear side" refer to the front side and rear side in the insertion direction, unless it is explicitly indicated that the terms are used with respect to a different direction. A jack includes a housing that, in a state in which a plug has been inserted into the jack, surrounds a part of the plug. An opening (insertion port) for inserting a plug is provided in a housing. In the following description, the surface of a housing that is located opposite the opening in the insertion direction is referred to as a "back surface".

Adapters are used to connect optical fibers to one another without performing fusion splicing. In the present specification, the term "adapter" refers to an optical member (connector) that includes two jacks and that is for connecting optical fibers that have plugs provided at the end portions thereof (hereinafter "plugged optical fibers") to one another. Specifically, an adapter is an optical member obtained by connecting the back surfaces of two jacks to one another. For example, an adapter is used in an optical distribution frame, and the cores of two plugged optical fibers are connected to one another by respectively inserting the plugs of the two optical fibers into the two jacks of the adapter. Note that, in the present specification, an adapter is also regarded as one type of connector.

FIGS. 1A and 1B illustrate an SC-connector plug, where FIG. 1A is a side view and FIG. 1B is a plan view taken from the upper side in FIG. 1A. Note that, in order to simplify description and facilitate understanding of the invention, the structures of optical members illustrated in the drawings do not accurately represent the actual structures and are simplified. Furthermore, the scales of optical members illustrated in the drawings differ among the drawings. In addition, in order to facilitate understanding of the invention, among elements constituting the optical members, those elements that are being described are indicated in an easily recognizable manner in the drawings. Thus, in the drawings, the relative sizes of elements constituting the optical members may differ from their actual sizes. As illustrated in FIGS. 1A and 1B, the plug includes a grip 80 that is to be inserted into a jack. A guide key 81 is provided on the upper surface of the grip 80, and recesses 82 are provided in the two side surfaces of the grip 80.

FIGS. 2A and 2B illustrate a so-called SC-connector adapter, where FIG. 2A is a diagram illustrating an external appearance and FIG. 2B is a diagram illustrating an internal structure. As described above, the adapter is obtained by connecting the back surfaces of two jacks 90L and 90R to one another. The plug is inserted into the jack 90R along the X direction, and the plug is inserted into the jack 90L along the Y direction, which is the opposite direction from the X direction. Thus, the insertion direction of the jack 90R is the X direction, and the insertion direction of the jack 90L is the Y direction, which is the opposite direction from the X direction. Each of the jacks 90L and 90R includes a housing 95 that, in a state in which the plug has been inserted into the jack, surrounds a part of the plug. A cross-section of the housing 95 that is orthogonal to the plug insertion direction is rectangular, and the housing 95 has four surfaces. A guide groove 91 is provided in one of the four surfaces. The guide groove 91 fits onto the guide key 81, and the size of the insertion port of the housing 95 is set so that the plug cannot be inserted into the jack unless the guide key 81 is inserted along the guide groove 91. In such a manner, the orientation of the plug (also referred to hereinafter as the state of the plug) when the plug is inserted into the jacks 90L or 90R is restricted by the guide key 81 and the guide groove 91. Furthermore, as illustrated in FIG. 2B, the jacks 90 include two elastic locking claws 92 in the inside thereof. In a state in which the plug has been inserted into each of the jacks 90, the two elastic locking claws 92 engage with the recesses 82 of the grip 80 and hold the plug.

There are various types of optical fiber connectors other than the above-described SC connector. However, optical fiber connectors basically include a structure that holds a plug inserted into a jack (for example, the elastic locking claws 92 and the recesses 82 in the SC connector), and a structure for restricting the orientation of the plug when the plug is inserted into the jack (for example, the guide key 81 and the guide groove 91 in the SC connector). Note that there also are connectors, such as an LC connector for example, in which the same structure serves as a structure that holds a plug inserted into a jack and a structure for restricting the orientation of the plug. Specifically, in the LC connector, a lever-shaped member is provided on a plug, and the orientation of the plug when the plug is inserted into a jack is restricted by the lever-shaped member, and the plug is also held to the jack by the lever-shaped member.

PTL1 discloses an MCF plug, and the configuration of the connection between two plugged MCFs.

CITATION LIST

Patent Literature

PTL1: Japanese Patent Laid-Open No. 2014-182229

MCFs are fibers including a plurality of cores, and each core is provided with a core number. Furthermore, when two MCFs are connected, cores having the same core numbers are connected to one another. Here, MCFs are connected not only by means of connectors but also by means of fusion splicing. For example, in a case in which cores having different core numbers have been connected to one another due to a fusion splicing error, there is a demand to simply correct the erroneous connection.

SUMMARY OF THE INVENTION

According to an aspect of the present invention, a connector that connects a first multi-core optical fiber to which a first plug is provided and a second multi-core optical fiber to which a second plug is provided to one another, includes: a first jack for inserting the first plug; and a second jack for inserting the second plug, wherein the first jack is configured so that the first plug in a first state and the first plug in a second state can at least be inserted thereinto, and the first plug in the second state is obtained by rotating the first plug in the first state by 180 degrees about an insertion direction as the axis of rotation, the insertion direction being the direction in which the first plug is inserted into the first jack.

According to the present invention, erroneous MCF connections can be simply corrected.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

FIG. 10C is a cross-sectional view of the connector according to one embodiment.
FIG. 11 is a diagram illustrating a state in which a plug has been inserted into the connector according to one embodiment.

DESCRIPTION OF THE EMBODIMENTS

Figure 1A:
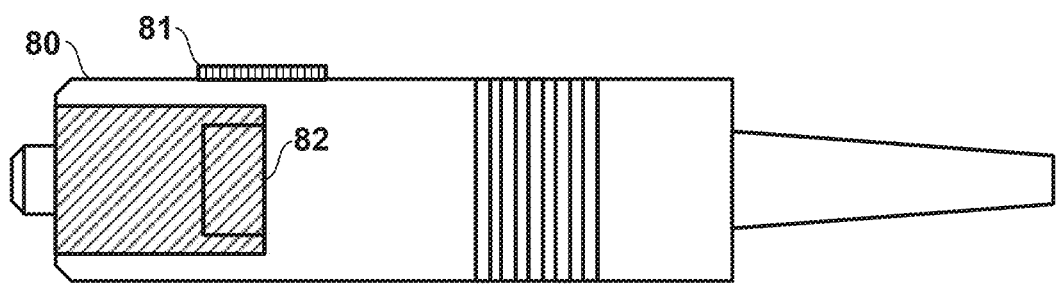
FIG. 1A is a diagram illustrating an SC connector plug.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 3:
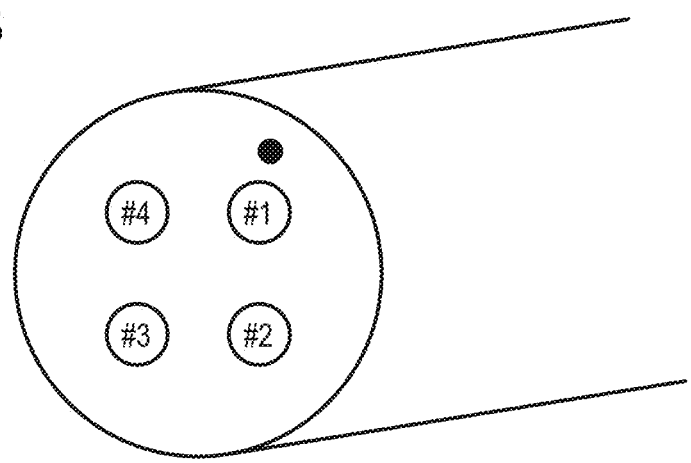
FIG. 3 is a diagram illustrating an MCF.

Note that, in the following, embodiments will be described regarding that an MCF has the four cores illustrated in FIG. 3. Core numbers are assigned to the cores. In FIG. 3, core number #1 is assigned to the core that is closest to a marker (black circle in the drawing), and core numbers #2, #3, and #4 are assigned along the clockwise direction from the core having core number #1.

First Embodiment

Figure 1B:
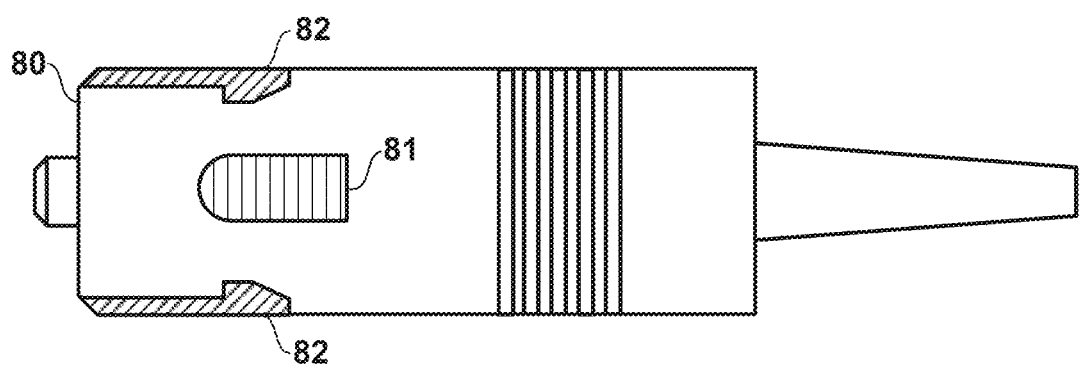
FIG. 1B is a diagram illustrating the SC connector plug.
Figure 2A:
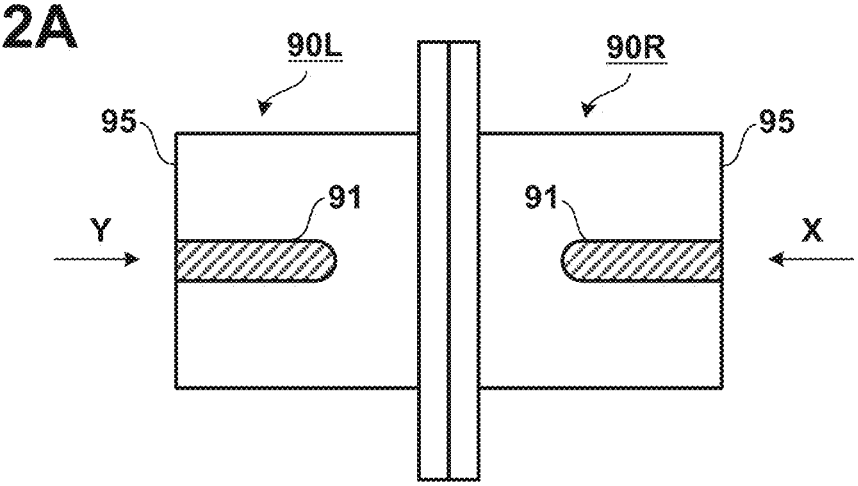
FIG. 2A is a diagram illustrating an external appearance of an SC connector adapter.
Figure 2B:
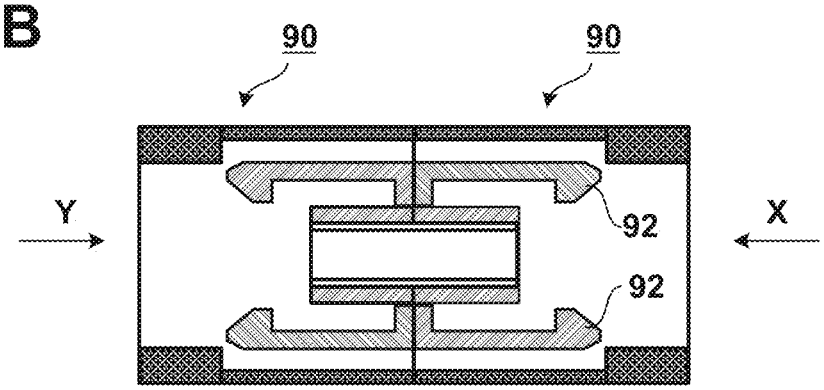
FIG. 2B is a diagram illustrating an internal structure of the SC connector adapter.
Figure 4A:
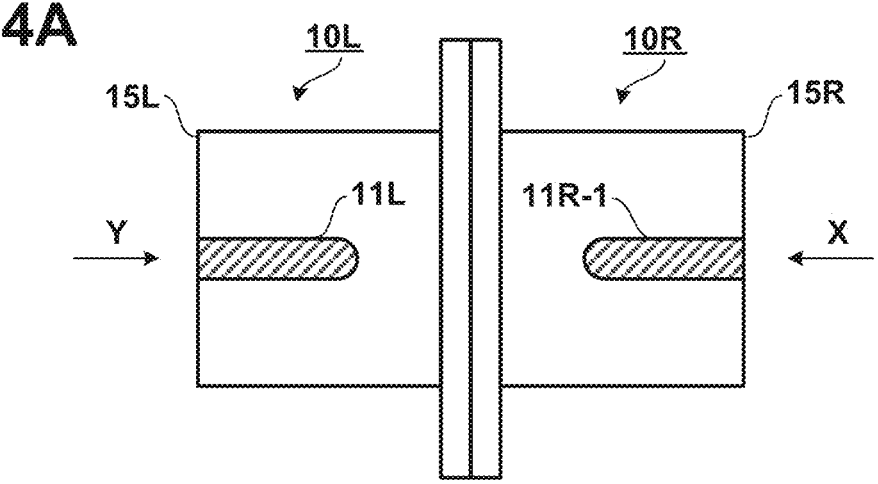
FIG. 4A is a diagram illustrating an external appearance of a connector according to one embodiment.
Figure 4B:
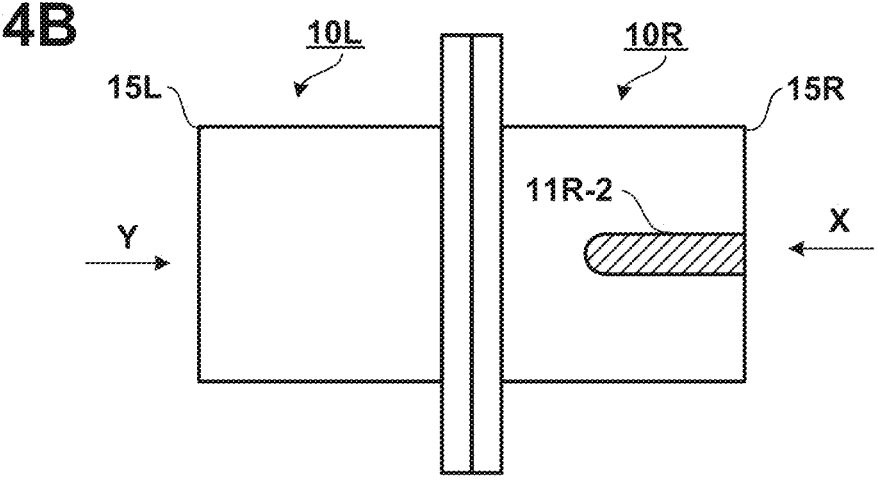
FIG. 4B is a diagram illustrating the external appearance of the connector according to one embodiment.

FIGS. 4A and 4B are diagrams illustrating a configuration of an adapter according to the present embodiment. Note that the plug to be inserted into this adapter is as illustrated in FIGS. 1A and 1B. FIG. 4A is a top view, and FIG. 4B is a bottom view, i.e., a diagram illustrating a state in which the adapter in the state illustrated in FIG. 4A has been rotated by 180 degrees about the insertion direction as the axis of rotation. The adapter is obtained by connecting the back surfaces of two jacks 10L and 10R to one another. Note that the internal structures of the jacks 10L and 10R are the same as the internal structure illustrated in FIG. 2B. The plug is inserted into the jack 10R along the X direction, and the plug is inserted into the jack 10L along the Y direction, which is the opposite direction from the X direction. The jacks 10L and 10R respectively include housings 15L and 15R that, in a state in which the plug has been inserted into the jack, surrounds a part of the plug. A cross-section of each of the housings 15L and 15R that is orthogonal to the plug insertion direction is rectangular, and each of the housings 15L and 15R has four surfaces.

A guide groove 11L for inserting the guide key 81 is provided in one of the four surfaces of the housing 15L. On the other hand, in the housing 15R, guide grooves 11R-1 and 11R-2 for inserting the guide key 81 are provided in both of two mutually opposing and mutually parallel surfaces among the four surfaces. In FIGS. 4A and 4B, the guide groove 11R-1 is provided on the same side as the guide groove 11L, and the guide groove 11R-2 is provided in the surface opposing the surface in which the guide groove 11R-1 is provided.

Figure 5:
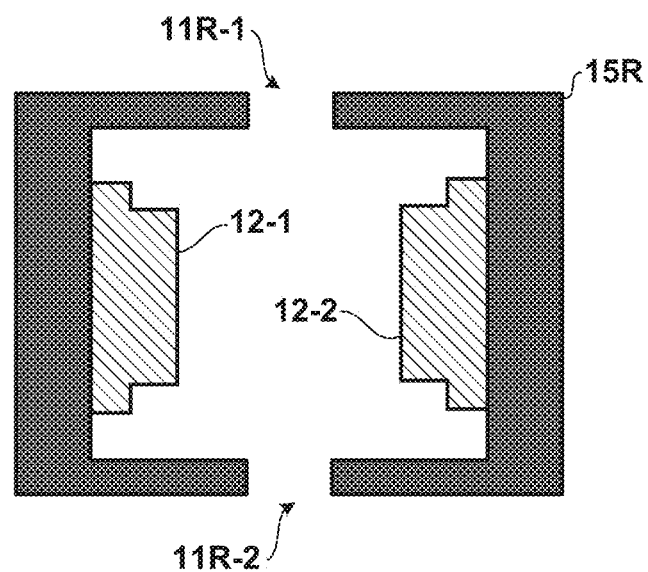
FIG. 5 is a diagram illustrating a state of the connector according to one embodiment as seen from an insertion port.

FIG. 5 is a diagram illustrating a state when the insertion port is seen from the outside of the jack 10R. Note that, as illustrated in FIGS. 4A and 4B, the guide grooves 11R-1 and 11R-2 are not provided over the entire housing 15R in the insertion direction, and rather, are provided over an area having a predetermined length corresponding to the length of the guide key 81 from the insertion port. Thus, when seen from the insertion port, the end portions of the guide grooves 11R-1 and 11R-2 would actually be visible. However, the end portions of the guide grooves 11R-1 and 11R-2 are omitted in FIG. 5 in order to emphasize the presence of the guide grooves 11R-1 and 11R-2.

Two elastic locking claws 12-1 and 12-2, which are holding members for holding the plug, are provided inside the housing 15R. Note that, while a member called a sleeve for holding a ferrule of the plug, etc., for example, are provided inside the housing 15R, such components are omitted to simplify the drawing. The elastic locking claws 12-1 and 12-2 are respectively provided on the surfaces of the housing 15R that are different from the surfaces in which the guide grooves 11R-1 and 11R-2 are provided. Note that the internal structure of the housing 15L is the same as the internal structure of the housing 15R.

Thus, the plug can be inserted into the jack 10R such that the guide key 81 is inserted along the guide groove 11R-1. This state of the plug is referred to as a "first state" or a "first orientation". The plug can also be inserted into the jack 10R such that the guide key 81 is inserted along the guide groove 11R-2. This state of the plug is referred to as a "second state" or a "second orientation". The plug in the second state (or the second orientation) is obtained by rotating the plug in the first state (or the first orientation) by 180 degrees about the insertion direction as the axis of rotation.

In the following, the plug that is inserted into the jack 10R is referred to as a plug R, and the MCF to which the plug R is provided is referred to as an MCF-R, whereas the plug that is inserted into the jack 10L is referred to as a plug L, and the MCF to which the plug L is provided is referred to as an MCF-L. Because only one guide groove 11L is provided in the jack 10L, the orientation in which the plug L is inserted into the jack 10L is restricted to one. On the other hand, as described above, the plug R can be inserted into the jack 10R in the first orientation or the second orientation.

For example, suppose that the cores of the MCF-L and the cores of the MCF-R having the same core numbers are connected to one another if the plug R is inserted into the jack 10R in the first orientation. In this case, if the plug R is inserted into the jack 10R in the second orientation, the cores of the MCF-L having the core numbers #1, #2, #3, and #4 can be respectively connected to the cores of the MCF-R having the core numbers #3, #4, #1, and #2.

Second Embodiment

Figure 6A:
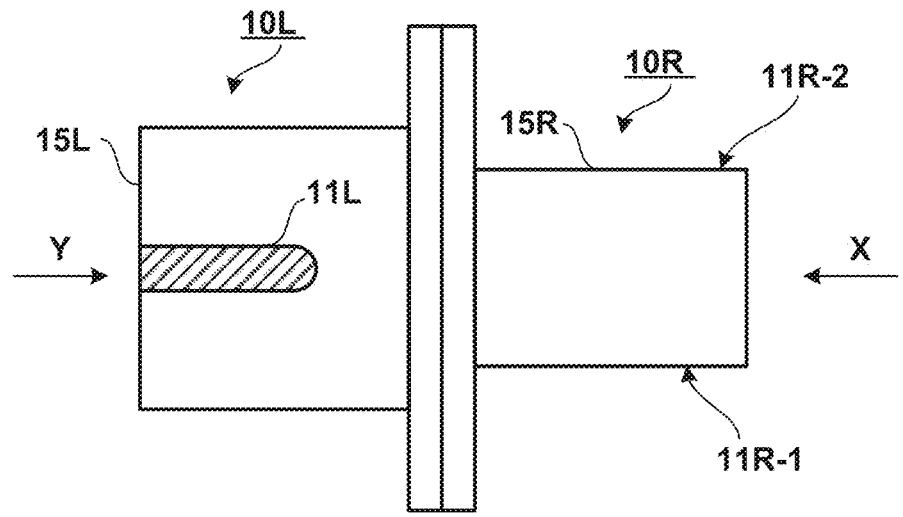
FIG. 6A is a diagram illustrating an external appearance of a connector according to one embodiment.
Figure 6B:
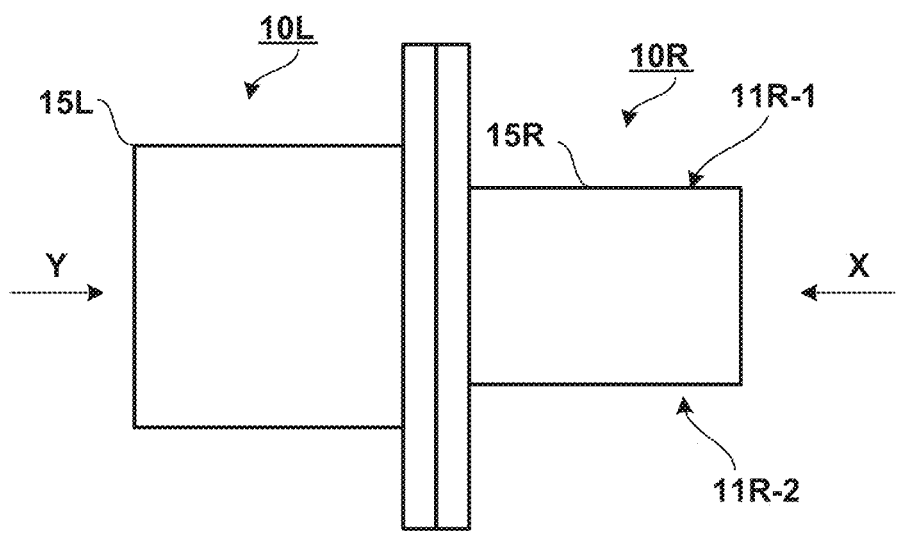
FIG. 6B is a diagram illustrating the external appearance of the connector according to one embodiment.

Next, a second embodiment will be described while focusing on the differences from the first embodiment. FIGS. 6A and 6B are diagrams illustrating a configuration of an adapter according to the present embodiment. Note that the plug to be inserted into this adapter is as illustrated in FIGS. 1A and 1B. FIG. 6A is a top view, and FIG. 6B is a bottom view, i.e., a diagram illustrating a state in which the adapter in the state illustrated in FIG. 6A has been rotated by 180 degrees about the insertion direction as the axis of rotation. In the present embodiment, the jack 10R illustrated in FIGS. 4A and 4B is rotated by 90 degrees relative to the jack 10L. Accordingly, in FIGS. 6A and 6B, the guide grooves 11R-1 and 11R-2 are provided in the two surfaces that are orthogonal to the drawings.

Thus, the MCF-L and the MCF-R can be connected in a state in which the MCF-R is rotated by 90 degrees relative to the MCF-L, or in a state in which the MCF-R is rotated by 270 degrees relative to the MCF-L. That is, the cores of the MCF-L having the core numbers #1, #2, #3, and #4 can be connected to the cores of the MCF-R having the core numbers #4, #1, #2, and #3, or to the cores of the MCF-R having the core numbers #2, #3, #4, and #1.

Third Embodiment

Next, a third embodiment will be described while focusing on the differences from the first and second embodiments. The adapter according to the first embodiment allows the MCF-R to be connected to the MCF-L in a state in which the MCF-R is rotated by 0 degrees or 180 degrees relative to the MCF-L, and the adapter according to the second embodiment allows the MCF-R to be connected to the MCF-L in a state in which the MCF-R is rotated by 90 degrees or 270 degrees relative to the MCF-L. Thus, in order to overcome erroneous connections occurring due to fusion splicing errors, for example, both the adapter according to the first embodiment and the adapter according to the second embodiment need to be prepared, and the two adapters need to be used appropriately in accordance with the erroneous connection to be overcome. An adapter according to the present embodiment allows the MCF-R to be connected to the MCF-L in a state in which the MCF-R is rotated by 0 degrees, 90 degrees, 180 degrees, or 270 degrees relative to the MCF-L.

Figure 7A:
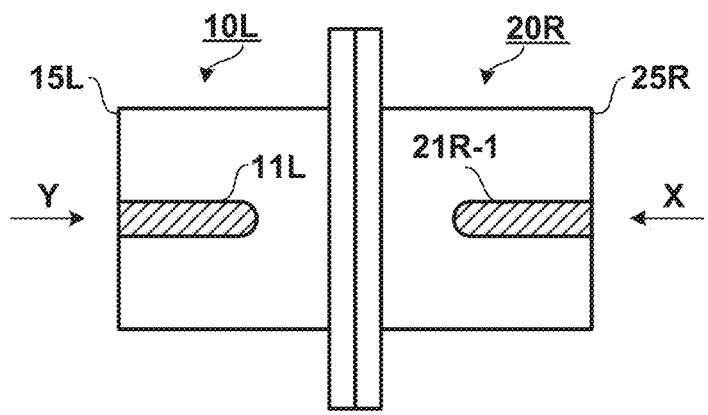
FIG. 7A is a diagram illustrating an external appearance of a connector according to one embodiment.

FIGS. 7A to 7D are diagrams illustrating an external appearance of the adapter according to the present embodiment. Note that the plug to be inserted into this adapter is as illustrated in FIGS. 1A and 1B. FIG. 7A is a top view, and FIGS. 7B, 7C, and 7D respectively indicate states in which the adapter has been rotated by 90 degrees, 180 degrees, and 270 degrees from the state in FIG. 7A about the insertion direction as the axis of rotation. The adapter is obtained by connecting the back surfaces of two jacks 10L and 20R to one another. Note that, because the structure of the jack 10L is the same as that in the first and second embodiments, the jack 20R will be mainly described in the following.

The jack 20R includes a housing 25R that, in a state in which the plug has been inserted into the jack, surrounds a part of the plug. The housing 25R has four surfaces, and a cross-section of the housing 25R that is orthogonal to the insertion direction is square.

Figure 7B:
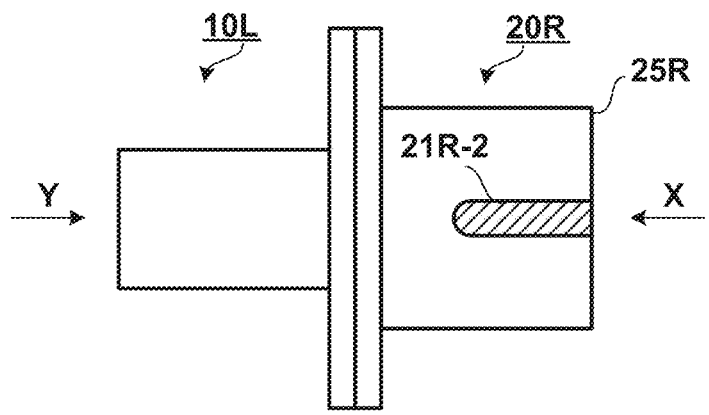
FIG. 7B is a diagram illustrating the external appearance of the connector according to one embodiment.
Figure 7C:
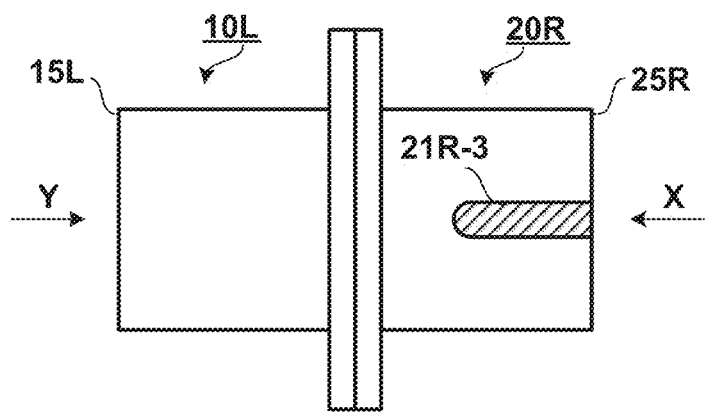
FIG. 7C is a diagram illustrating the external appearance of the connector according to one embodiment.
Figure 7D:
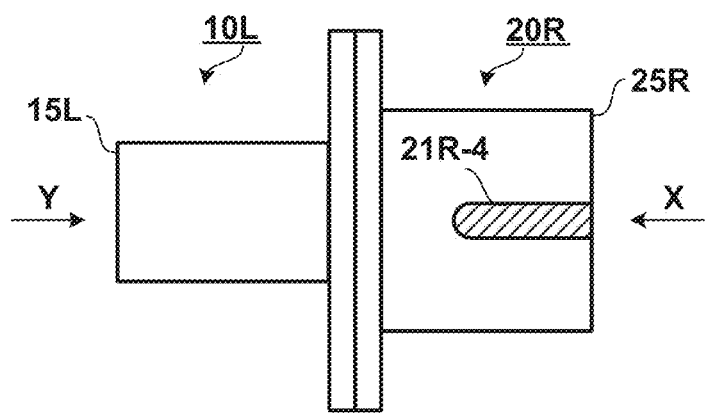
FIG. 7D is a diagram illustrating the external appearance of the connector according to one embodiment.
Figure 8A:
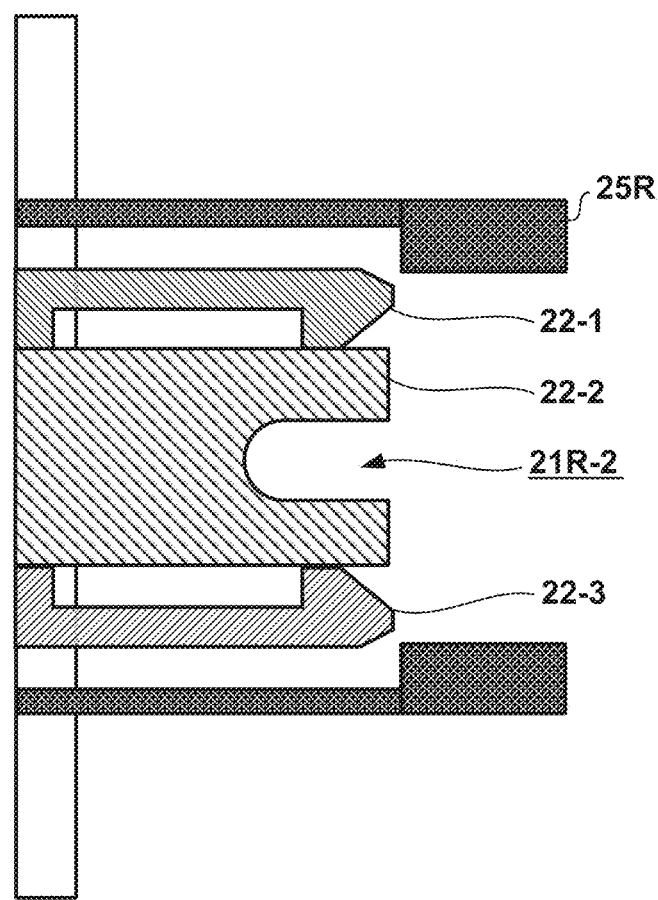
FIG. 8A is a diagram illustrating an internal structure of the connector according to one embodiment.
Figure 8B:
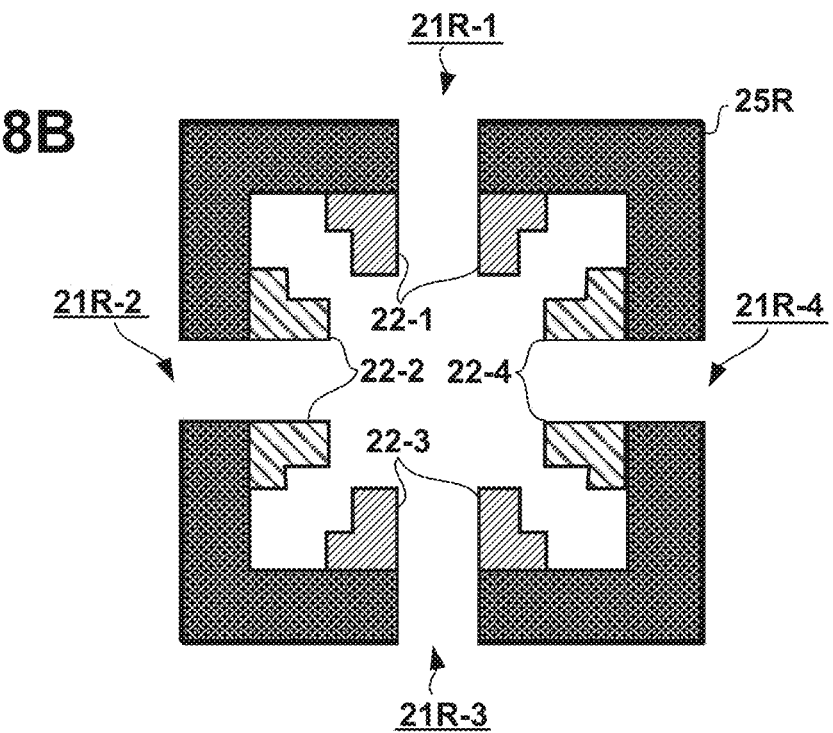
FIG. 8B is a diagram illustrating a state of the connector according to one embodiment as seen from the insertion port.

In the present embodiment, a guide groove for inserting the guide key 81 is provided in all surfaces of the housing 25R. Specifically, guide grooves 21R-1, 21R-2, 21R-3, and 21R-4 are provided in the jack 20R. FIG. 8A is a diagram illustrating an internal structure of the housing 25R. Note that FIG. 8A illustrates a state in which the guide groove 21R-2 is located on the front side as illustrated in FIG. 7B. Furthermore, FIG. 8B is a diagram illustrating the insertion port as seen from the outside of the jack 20R, similarly to FIG. 5. Note that, as was the case in FIG. 5, illustration is provided in a state in which the end portions of the guide grooves 21R-1 to 21R-4 are omitted in order to illustrate the guide grooves 21R-1 to 21R-4 in an emphasized state.

As illustrated in FIG. 8B, four elastic locking claws 22-1 to 22-4, which are holding members, are provided inside the housing 25R. Note that, while a member called a sleeve for holding a ferrule of the plug, etc., for example, are provided inside the housing 25R, such components are omitted to simplify the drawing. A guide groove matching a guide groove in the housing 25R is provided in each of the elastic locking claws 22-1 to 22-4. Due to the guide grooves provided in the elastic locking claws 22-1 to 22-4, the plug can be inserted into the jack 20R in any one of first to fourth states (first to fourth orientations). Note that the first state to fourth states are the states when the guide key 81 is inserted along the guide grooves 21R-1 to 21R-4, respectively. Thus, the plug in the second, third, and fourth states is obtained by rotating the plug in the first state by 90, 180, and 270 degrees about the insertion direction as the axis of rotation, respectively.

Figure 9:
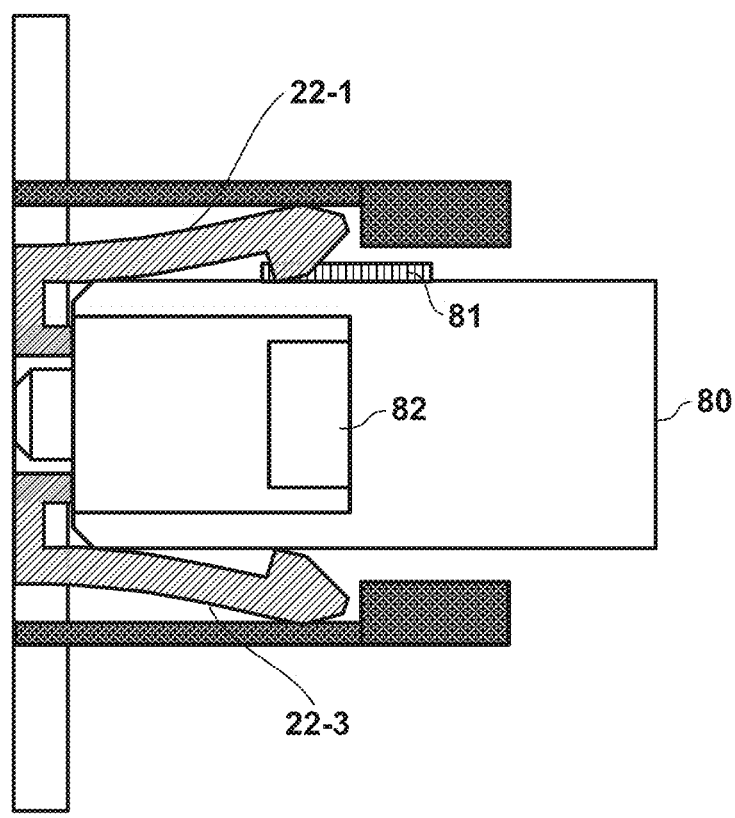
FIG. 9 is a diagram illustrating a state in which a plug has been inserted into the connector according to one embodiment.

FIG. 9 illustrates a state in which the plug has been inserted into the jack 20R in the first state, i.e., a state in which the plug has been inserted into the jack 20R such that the guide key 81 is inserted along the guide groove provided in the elastic locking claw 22-1. Note that, in order to illustrate the state of the plug in an emphasized state, the elastic locking claw 22-2 on the front side of the plug is omitted in FIG. 9. When the plug is inserted into the jack 20R in the first state, the elastic locking claws 22-1 and 22-3 are pushed toward the inner surface of the housing 25R by the grip 80 of the plug. On the other hand, the elastic locking claws 22-2 and 22-4 hold the plug by engaging with the recesses 82 of the grip 80 from the front side and the rear side in FIG. 9. This is the same when the plug is inserted in the other states as well. So that the plug can be inserted in such a manner, a space allowing the elastic locking claws 22-1 to 22-4 to deform is provided inside the housing 25R. In FIG. 9, a space allowing the elastic locking claws 22-1 to 22-4 to deform is secured by reducing the thickness of the housing 25R in a region where the elastic locking claws 22-1 to 22-4 are provided.

According to the above-described configuration, the MCF-L and the MCF-R can be connected in a state in which the MCF-R is rotated by 0 degrees, 90 degrees, 180 degrees, or 270 degrees relative to the MCF-L.

Fourth Embodiment

Next, a fourth embodiment will be described while focusing on the differences from the third embodiment. An adapter according to the present embodiment connects the MCF-L and the MCF-R in a state in which the MCF-R is rotated by 0 degrees, 90 degrees, 180 degrees, or 270 degrees relative to the MCF-L, similarly to the third embodiment, and the basic configuration thereof is similar to that in the third embodiment. Specifically, the jack 20R is configured so that the plug R can be inserted into the jack 20R in any one of the first to fourth states. Thus, a cross-section of the housing 25R that is orthogonal to the insertion direction is square, as illustrated in FIG. 8B for example. On the other hand, a cross-section of the grip 80 of the plug that is orthogonal to the insertion direction is rectangular, and thus, as illustrated in FIG. 5, a cross-section of the housing 10R in the first and second embodiments that is orthogonal to the insertion direction is rectangular.

Figure 10A:
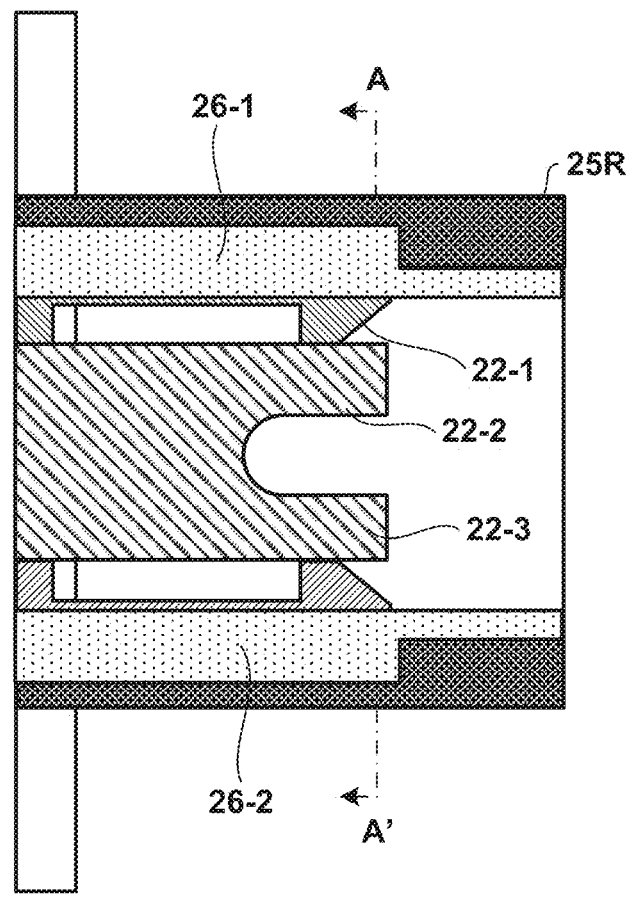
FIG. 10A is a diagram illustrating an internal structure of a connector according to one embodiment.
Figure 10B:
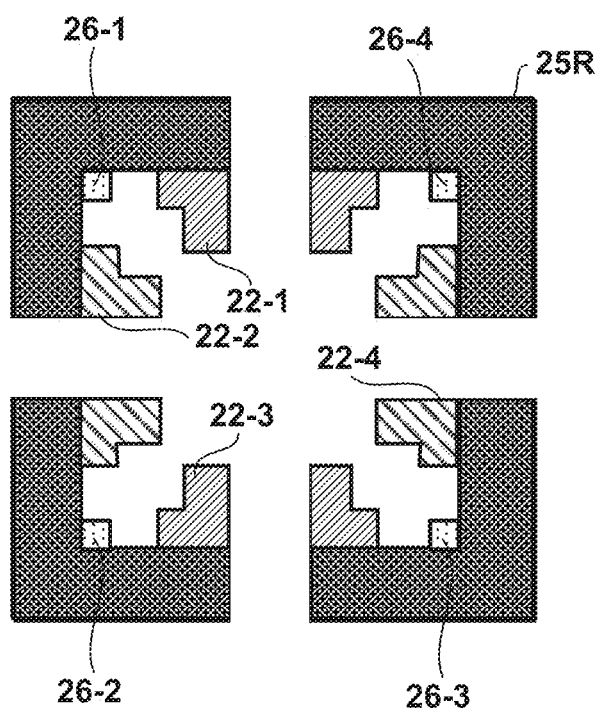
FIG. 10B is a diagram illustrating a state of the connector according to one embodiment as seen from an insertion port.

As a result of the housing 25R being provided with a square cross-section, when the plug is inserted into the housing, the plug may be held in an unstable state due to a decrease in the area of contact between the plug and the inner surface of the housing 25R. Thus, in the present embodiment, guides 26-1 to 26-4, which are support members, are provided in the four corners (portions where the surfaces are connected to one another) inside the housing 25R. FIG. 10A corresponds to FIG. 8A in the third embodiment, and illustrates an internal structure of the housing 25R. In addition, FIG. 10B corresponds to FIG. 8B in the third embodiment, and is a diagram when the insertion port is seen from the outside of the jack 20R. Furthermore, FIG. 10C is a cross-sectional view taken along line A-A' in FIG. 10A. Note that, in FIGS. 10B and 10C, the end portions of the guide grooves are omitted in order to emphasize the guide grooves, as is the case in other drawings.

FIG. 11 is a cross-sectional view taken along line A-A' in FIG. 10A when the plug has been inserted into the jack 20R in the first state. The guide key 81 is inserted along the guide groove in the elastic locking claw 22-1. Furthermore, the elastic locking claws 22-1 and 22-3 are deformed so as to move toward the inner-surface side of the housing 25R by the grip 80. On the other hand, the elastic locking claws 22-2 and 22-3 hold the plug by engaging with the recesses 82 in the grip 80. Furthermore, the guides 26-1 to 26-4 provided in the four corners inside the housing 25R are in contact with the grip 80 and support the grip 80.

The plug inserted into the jack 25R can be held in a stable state by providing the guides 26-1 to 26-4 inside the housing 25R, as illustrated in FIGS. 10A to 10C and FIG. 11.

Other Embodiments

The jack 10R in the first and second embodiments is configured so that the plug can be inserted in either one of two states, and the jack 20R in the third and fourth embodiments is configured so that the plug can be inserted in any one of four states. However, a case in which a configuration is adopted such that the plug can be inserted in any one of a predetermined number of states other than two or four, e.g., six states, is also included within the scope of the present invention. Note that this jack is configured so that, while the plug can be inserted into the jack in any one of the predetermined number of states, the plug cannot be inserted into the jack in other states.

In the above-described embodiments, the adapter is obtained by connecting the jack 10L, in which only one guide groove is provided, and the jack 10R or 20R, in which two or more guide grooves are provided. However, both jacks may be provided with the same configuration. Furthermore, adapters obtained by connecting the back surfaces of two jacks of any type described in the first to fourth embodiments to one another are also included within the scope of the present invention. Furthermore, guide grooves matching the elastic locking claws are also provided in the surfaces of the housing 25R in the third and fourth embodiments. This configuration is adopted in order to make the state of the guide grooves and the guide key 81 visible from the outside, and in consideration of a case such as that in which the guide key 81 is thick and the plug cannot be inserted unless guide grooves are also provided in the housing 25R. However, guide grooves need not be provided in the housing 25R if the plug can be inserted by only providing guide grooves in the elastic locking claws as illustrated in FIGS. 8 and 11 without providing guide grooves in the housing 25R.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A connector that connects a first multi-core optical fiber to a second multi-core optical fiber, wherein a first plug is provided to the first multi-core optical fiber and a second plug is provided to the second multi-core optical fiber, the connector comprising:
   a first jack for inserting the first plug; and
   a second jack for inserting the second plug,
   wherein the first jack is configured so that the first plug in a first state and the first plug in a second state can at least be inserted thereinto, and the first plug in the second state is obtained by rotating the first plug in the first state by 180 degrees about an insertion direction as the axis of rotation, the insertion direction being the direction in which the first plug is inserted into the first jack.

2. The connector according to claim 1, wherein the first jack is configured so that the first plug in a state different from the first state and the second state cannot be inserted thereinto.

3. The connector according to claim 2,
wherein a guide groove for restricting a state of the first plug inserted into the first jack is provided in the first jack, and the first jack includes a housing that surrounds a part of the first plug inserted into the first jack, and
the guide groove is provided in both a first surface and a second surface of the housing of the first jack, the second surface opposing the first surface.

4. The connector according to claim 3, wherein the second jack is configured so that the second plug can be inserted thereinto in only one state.

5. The connector according to claim 4,
wherein a guide groove for restricting a state of the second plug inserted into the second jack is provided in the second jack, and the second jack includes a housing that surrounds a part of the second plug inserted into the second jack, and
the guide groove is provided in only one surface of the housing of the second jack.

6. The connector according to claim 3,
wherein a guide groove for restricting a state of the second plug inserted into the second jack is provided in the second jack, and the second jack includes a housing that surrounds a part of the second plug inserted into the second jack, and
the guide groove is provided in both of two mutually opposing surfaces of the housing of the second jack.

7. The connector according to claim 5, wherein a surface of the housing of the second jack in which the guide groove is provided are parallel with the first surface of the housing of the first jack.

8. The connector according to claim 5, wherein a surface of the housing of the second jack in which the guide groove is provided are orthogonal to the first surface of the housing of the first jack.

9. The connector according to claim 1,
wherein the first jack is configured so that the first plug can be inserted thereinto in any one of the first state, the second state, a third state, and a fourth state,
the first plug in the third state is obtained by rotating the first plug in the first state by 90 degrees about the insertion direction as the axis of rotation, and
the first plug in the fourth state is obtained by rotating the first plug in the first state by 270 degrees about the insertion direction as the axis of rotation.

10. The connector according to claim 9, wherein the first jack is configured so that the first plug in a state different from the first state, the second state, the third state, and the fourth state cannot be inserted thereinto.

11. The connector according to claim 10,
wherein the first jack includes a housing that surrounds a part of the first plug inserted into the first jack,
the housing of the first jack includes a first surface, a second surface that opposes the first surface, a third surface that is connected to the first surface and the second surface, and a fourth surface that opposes the third surface and that is connected to the first surface and the second surface,
inside the housing of the first jack, holding members for holding the first plug inserted into the first jack are provided so as to respectively correspond to the first surface, the second surface, the third surface, and the fourth surface, and
a guide groove for restricting the state of the first plug inserted into the first jack is provided in each of the holding members.

12. The connector according to claim 11, wherein a guide groove matching the guide groove provided in the corresponding holding member is provided in each of the first surface, the second surface, the third surface, and the fourth surface of the housing of the first jack.

13. The connector according to claim 12, wherein, inside the housing of the first jack, support members for supporting the first plug inserted into the first jack are provided at portions where surfaces are connected to one another.

* * * * *